United States Patent
Tsai et al.

(10) Patent No.: US 10,903,883 B2
(45) Date of Patent: Jan. 26, 2021

(54) ANTENNAS SELECTION BASED ON SENSORS

(71) Applicant: HEWLETT-PACKARD DEVELOPMENT COMPANY, L.P., Houston, TX (US)

(72) Inventors: Ming-Shien Tsai, Taipei (CN); Leo J. Gerten, Austin, TX (US); Hung-Wen Cheng, Taipei (CN); Han-Kuang Chang, Taipei (CN); Yk Hsieh, Taipei (CN); Chung-Chun Chen, Taipei (CN)

(73) Assignee: Hewlett-Packard Development Company, L.P., Spring, TX (US)

( * ) Notice: Subject to any disclaimer, the term of this patent is extended or adjusted under 35 U.S.C. 154(b) by 223 days.

(21) Appl. No.: 16/088,585

(22) PCT Filed: Nov. 16, 2016

(86) PCT No.: PCT/US2016/062158
§ 371 (c)(1),
(2) Date: Sep. 26, 2018

(87) PCT Pub. No.: WO2018/093358
PCT Pub. Date: May 24, 2018

(65) Prior Publication Data
US 2020/0304185 A1 Sep. 24, 2020

(51) Int. Cl.
*H04B 7/02* (2018.01)
*H04L 1/02* (2006.01)
(Continued)

(52) U.S. Cl.
CPC ......... *H04B 7/0608* (2013.01); *G06F 1/1618* (2013.01); *G06F 1/1677* (2013.01);
(Continued)

(58) Field of Classification Search
CPC .. H04B 7/0608; H04B 7/0822; H04B 7/0413; G06F 1/1618; G06F 1/1677; G06F 1/1698; G06F 1/1694; H01Q 21/28; H01Q 1/2266
(Continued)

(56) References Cited

U.S. PATENT DOCUMENTS 8,493,270 B2   7/2013   Hikino
8,725,213 B2   5/2014   Nakamura
(Continued)

FOREIGN PATENT DOCUMENTS

CN   101641828   2/2010
CN   103246324   8/2013
(Continued)

OTHER PUBLICATIONS

Vitol, "Payments POS-terminal Point Smart Terminal with Dual Screen on Android", Retrieved from Internet: https://www.devbattles.com/en/sand/post-136-Payments+POSterminal+Point+Smart+Terminal+with+dual+screen+on+Android, Nov. 8, 2014, 8 pages.

*Primary Examiner* — Tanmay K Shah
(74) *Attorney, Agent, or Firm* — HPI Patent Department

(57) ABSTRACT

An example electronic device includes a first housing including, a first display, a first antenna, a second antenna, and a first rotational motion sensor. The electronic device also includes a hinge including a bend sensor. The electronic device further includes a second housing rotatable coupled to the first housing via the hinge. The second housing includes a second display, a third antenna, a fourth antenna, and a second rotational motion sensor. The electronic device further includes a communication device to select two of the first antenna, the second antenna, the third antenna, and the fourth antenna based on the first rotational motion sensor, the second rotational motion sensor, and the bend sensor.

(Continued)

The communication device is also to transmit and receive data via each of the two selected antennas.

16 Claims, 9 Drawing Sheets

(51) Int. Cl.
  *H04B 7/06*       (2006.01)
  *G06F 1/16*       (2006.01)
  *H01Q 1/22*       (2006.01)
  *H01Q 21/28*      (2006.01)
  *H04B 7/0413*     (2017.01)
  *H04B 7/08*       (2006.01)

(52) U.S. Cl.
  CPC .......... *G06F 1/1694* (2013.01); *G06F 1/1698* (2013.01); *H01Q 1/2266* (2013.01); *H01Q 21/28* (2013.01); *H04B 7/0413* (2013.01); *H04B 7/0822* (2013.01)

(58) Field of Classification Search
  USPC .......................................................... 375/267
  See application file for complete search history.

(56) References Cited

U.S. PATENT DOCUMENTS

| | | | |
|---|---|---|---|
| 9,065,535 | B2 | 6/2015 | Wong et al. |
| 9,214,717 | B2 | 12/2015 | Tudosoiu |
| 9,318,792 | B2 | 4/2016 | Matsunaga et al. |
| 9,760,122 | B1* | 9/2017 | Aurongzeb ........... G06F 1/1618 |
| 2002/0094789 | A1 | 7/2002 | Harano |
| 2004/0164958 | A1* | 8/2004 | Park ..................... G06F 1/1616 |
| | | | 345/158 |
| 2010/0120379 | A1* | 5/2010 | Fukagawa ............ H01Q 1/2266 |
| | | | 455/90.2 |
| 2012/0116716 | A1* | 5/2012 | Lokshin ................ G01C 17/38 |
| | | | 702/150 |
| 2012/0196651 | A1* | 8/2012 | Nakamura ............... H01Q 3/24 |
| | | | 455/556.1 |
| 2013/0156080 | A1 | 6/2013 | Cheng et al. |
| 2013/0310119 | A1 | 11/2013 | Nilsson et al. |
| 2014/0361932 | A1* | 12/2014 | Irci ....................... H01Q 21/28 |
| | | | 343/702 |

FOREIGN PATENT DOCUMENTS

| | | |
|---|---|---|
| CN | 104238662 | 12/2014 |
| CN | 104272526 | 1/2015 |
| CN | 205122774 | 3/2016 |
| EP | 1727290 A1 | 11/1996 |

* cited by examiner

FIG. 9

| Orientation (902) | Operating Mode (904) | Bend Angle (906) | aGx (908) | aGy (910) | aGz (912) | bGx (914) | bGy (916) | bGz (918) | First Antenna 110 (920) | Second Antenna 112 (922) | Third Antenna 118 (924) | Fourth Antenna 120 (926) |
|---|---|---|---|---|---|---|---|---|---|---|---|---|
| | | | First Rotational Motion Sensor 114 | | | Second Rotational Motion Sensor 122 | | | | | | |
| 1 | Desktop | -180 | 180 | | | 0 | | | S | S | | |
| 2 | Desktop | -179...-1 | Δ | | | 0 | | | S | S | | S |
| 3 | Desktop | -179...-1 | 0 | 90 | | Δ | | | | | | S |
| 4 | Desktop | -179...-1 | | 90 | ±180 | 0 | 90 | ±180 | | | | S |
| 5 | Desktop | 0 | 0 | | | 0 | | | S | | | S |
| 6 | Desktop | 0 | 0 | | | 0 | | | | | | |
| 7 | Desktop | 0 | 90 | | | -90 | | | | | S | S |
| 8 | Desktop | 0 | 90 | | | -90 | | | | | S | S |
| 9 | Desktop | 1...179 | Δ | | | Δ | | | | S | S | |
| 10 | Desktop | 1...179 | -180 | | | -180 | | | S | S | | S |
| 11 | Desktop | 1...179 | -180 | | | 0 | | 0 | S | S | | |
| 12 | Desktop | 1...179 | -180 | | 0 | 0 | | -90 | S | | | |
| 13 | Tablet | 180 | -180 | | 90 | 0 | | -180 | S | | | S |
| 14 | Tablet | 180 | -180 | | 180 | 0 | | -270 | S | | | S |
| 15 | Tablet | 180 | -180 | | 270 | 0 | | 0 | S | | S | |
| 16 | Tablet | 180 | 0 | | 0 | 180 | | 90 | S | | S | S |
| 17 | Tablet | 180 | 0 | | -90 | 180 | | 180 | S | | S | S |
| 18 | Tablet | 180 | 0 | | -180 | 180 | | 270 | | S | S | S |
| 19 | Tablet | 180 | 0 | | -270 | 180 | | | | | | |
| 20 | Tablet | 180 | | | | | | | | | | |

ANTENNAS SELECTION BASED ON SENSORS

BACKGROUND

Wireless communication capability is an important aspect of electronic devices. In particular for notebook computers as the trend is to become thinner. Some notebook computers are so thin that there is not enough room to accommodate any physical communication ports.

BRIEF DESCRIPTION OF THE DRAWINGS

Some examples of the present application are described with respect to the following figures:

FIG. 9 illustrates a lookup table to determine antenna selections based on an orientation of an electronic device, according to an example.

DETAILED DESCRIPTION

In addition to becoming thinner, notebook computers also evolve in other aspects. For example, some notebook computers include dual displays. User behavior for a notebook computer with dual displays may be more complex than a notebook computer with a single display. For example, the user may interact with one or both of the dual displays. A user's interaction with the notebook computer may negatively affect the wireless performance of the notebook computer. For example, the user's body may block the wireless signal.

Examples described herein provide an approach to select antennas in an electronic device based on sensors. For example, an electronic device may include a first housing including, a first display, a first antenna, a second antenna, and a first rotational motion sensor. The electronic device may also include a hinge having a bend sensor. The electronic device may further include a second housing rotatable coupled to the first housing via the hinge. The second housing may include a second display, a third antenna, a fourth antenna, and a second rotational motion sensor. The electronic device may further include a communication device to select two of the first antenna, the second antenna, the third antenna, and the fourth antenna based on the first rotational motion sensor, the second rotational motion sensor, and the bend sensor. The communication device may transmit and receive data via each of the two selected antennas. In this manner, examples described herein may improve wireless performance of an electronic device.

Figure 1:
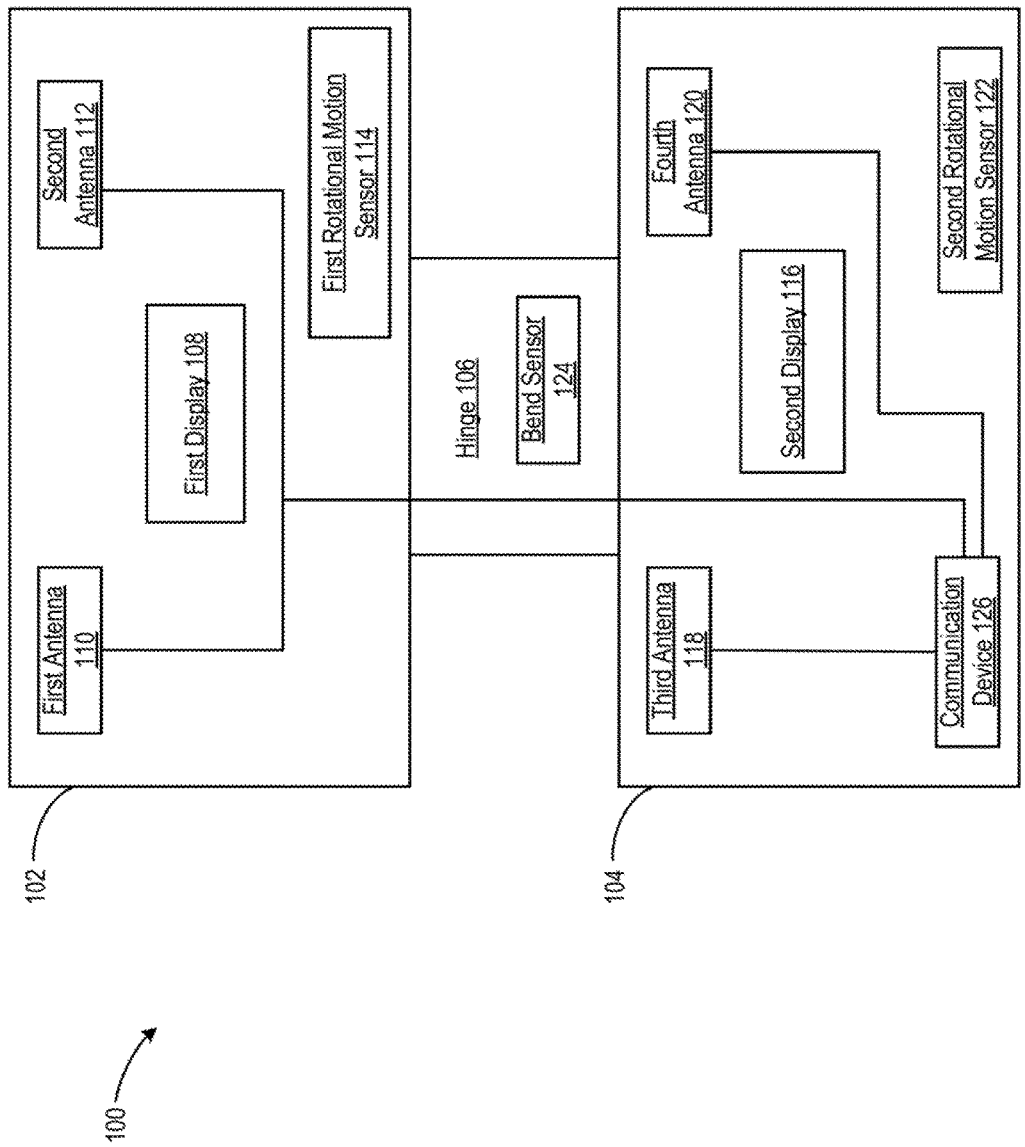
FIG. 1 illustrates a block diagram of an electronic device to select antennas for communication based on sensors, according to an example.

FIG. 1 illustrates a block diagram of an electronic device 100 to select antennas for communication based on sensors, according to an example. Electronic device 100 may be, a notebook computer, a tablet computer, or any other electronic device with a distinct display on each housing of the electronic device.

Electronic device 100 may include a first housing 102, a second housing 104, a hinge 106, and a communication device 126. First housing 102 may include a first display 108, a first antenna 110, a second antenna 112, and a first rotational motion sensor 114. Second housing 104 may include a second display 116, a third antenna 118, a fourth antenna 120, and a second rotational motion sensor 122. Hinge 106 may include a bend sensor 124. First housing 102 may be rotatably coupled to second housing 104 via hinge 106.

Displays 108 and 116 may be touch-sensitive displays that register physical touches as inputs. Rotational motion sensors 114 and 122 may be sensors that sense changes in rotational angle. For example, rotational motion sensors 114 and 122 may be implemented using gyro sensors. Bend sensor 124 may be a sensor that senses how much the sensor is flexed. Communication device 126 may be a circuit that performs transmission and reception of wireless signal for electronic device 100. Communication device 126 may be implemented as a transceiver. Communication device 126 may be disposed within electronic device 100. In some examples, communication device 126 may be disposed in second housing 104. In some examples, communication device 126 may be disposed in first housing 102.

During operation, communication device 126 may be connected to antennas 110, 112, 118, and/or 120 to transmit and receive wireless signal. Communication device 126 may select two of antennas 110, 112, 118, and 120 to transmit and receive wireless signal. In some examples, communication device 126 may transmit and receive wireless signal in a multiple-input/multiple-output (MIMO) communication network. Thus, each selected antenna may be used for both transmission and reception. Communication device 126 may select two antennas from antennas 110, 112, 118, and 120 based on feedbacks from first rotational motion sensor 114, second rotational motion sensor 122, bend sensor 124, or a combination thereof. Antenna selections are described in more detailed in FIGS. 7-9.

Figure 2:
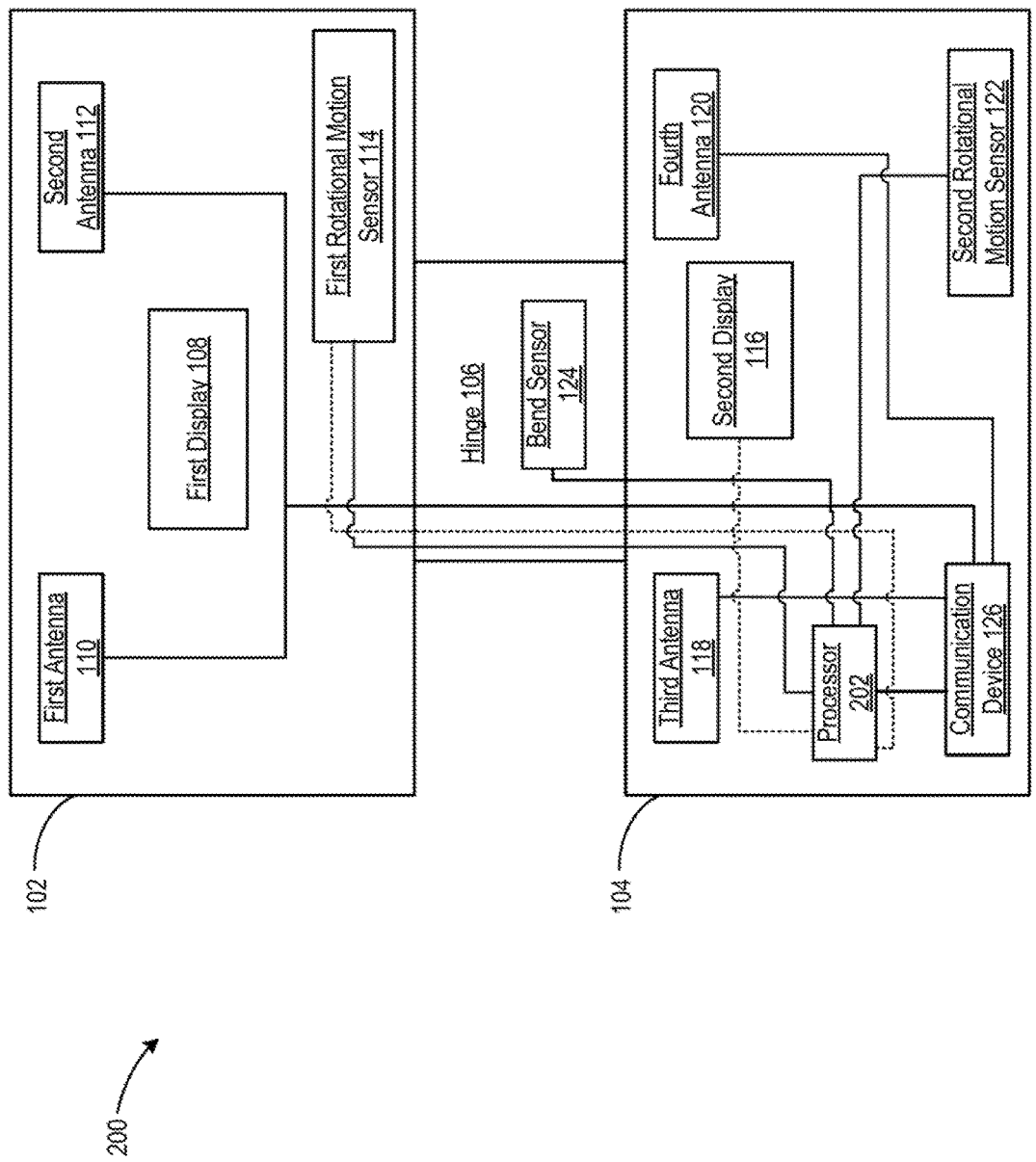
FIG. 2 illustrates a block diagram of an electronic device to select antennas for communication based on sensors, according to another example.

FIG. 2 illustrates a block diagram of an electronic device 200 to select antennas for communication based on sensors, according to another example. Electronic device 200 may components of electronic device 100 of FIG. 1. Electronic device 200 may also include a processor 202 that controls operations of electronic device 200. Processor 202 may be a central processing unit (CPU), a semiconductor-based microprocessor, and/or other hardware devices suitable for retrieval and execution of instructions stored in a computer-readable storage medium. Processor 202 may be connected to communication device 126, rotational motion sensors 114 and 122, and bend sensor 124.

During operation, processor 202 may receive feedbacks from first rotational motion sensor 114, second rotational motion sensor 122, bend sensor 124, or a combination thereof. Based the feedbacks, processor 202 may determine an orientation of first housing 102. Processor 202 may also determine an orientation of second housing 104. Processor 202 may further determine a bending angle of hinge 106. Based on the orientation of first housing 102, the orientation of second housing 104, and the bending angle, processor 202 may determine an orientation of electronic device 100. Processor 202 may instruct communication device 126 to select two of antennas 110, 112, 118, and 120 to transmit and receive wireless signal based on the orientation of electronic device 200.

In some examples, processor 202 may also receive feedbacks from displays 108 and 116. The feedbacks may indicate whether first display 108 and/or second display 116 is receiving a touch input. The presence of a touch input may indicate a likelihood that a user's hand or body may interfere with the signal strength of a wireless signal transmitted or received via any of antennas 110, 112, 118, and 120. For example, when first display 108 detects a touch input near the physical location of first antenna 110, processor 202 may determine that a user's hand is near first antenna 110 and the presence of the user's hand may reduce the signal strength of a wireless signal associated with first antenna 110. Thus, processor 202 may instruct communication device 126 to select antennas based on first rotational motion sensor 114, second rotational motion sensor 122, bend sensor 124, first display 108, second display 116, or a combination thereof.

Figure 3:
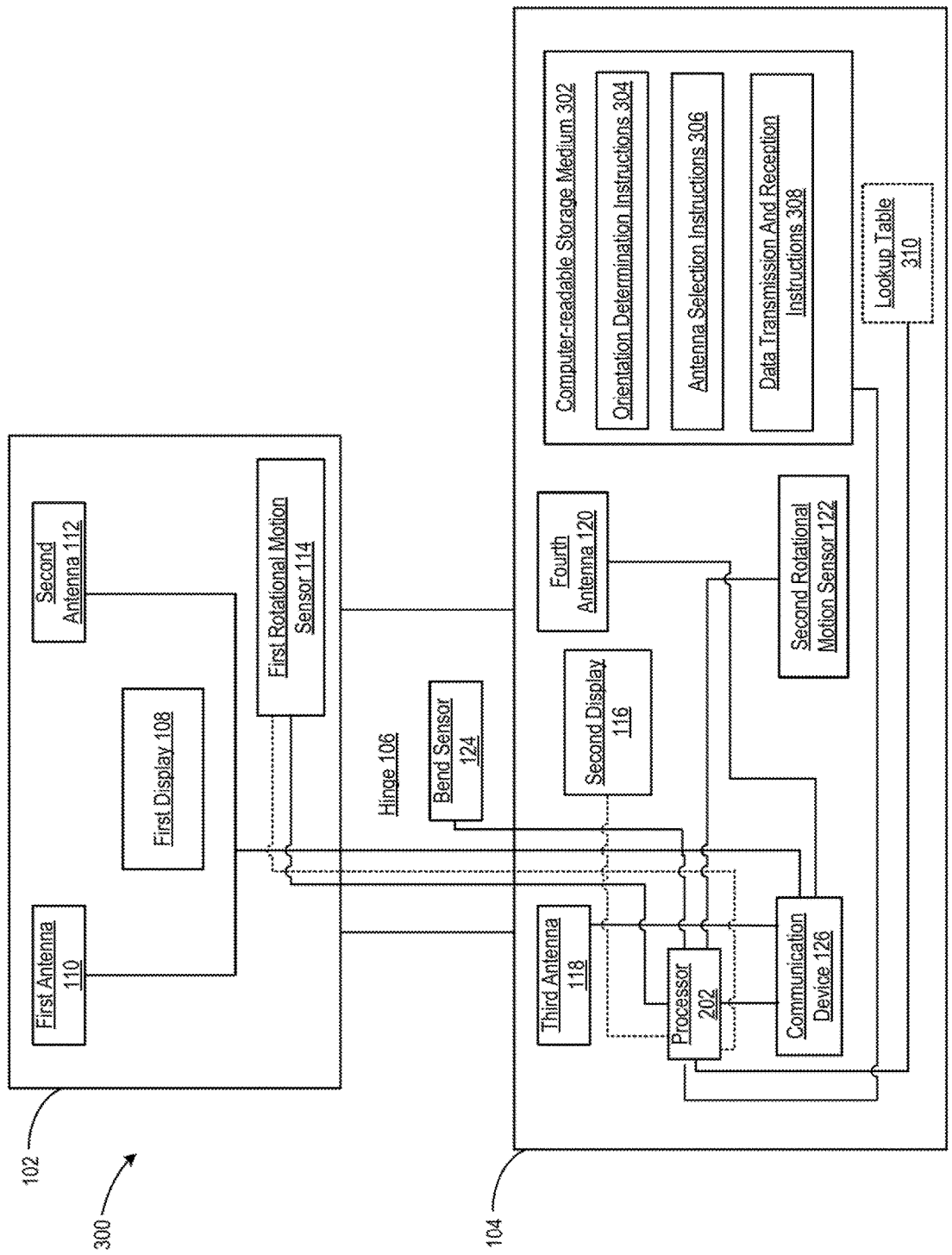
FIG. 3 illustrates a block diagram of an electronic device to select antennas for communication based on sensors, according to another example.

FIG. 3 illustrates a block diagram of an electronic device 300 to select antennas for communication based on sensors, according to another example. Electronic device 300 may be used to implement electronic device 100 of FIG. 1 and/or electronic device 200 of FIG. 2. Electronic device 300 may include components of electronic device 200. In addition, electronic device 300 may also include a computer-readable storage medium 302.

Computer-readable storage medium 302 may be any electronic, magnetic, optical, or other physical storage device that contains or stores executable instructions. Thus, computer-readable storage medium 302 may be, for example, Random Access Memory (RAM), an Electrically Erasable Programmable Read-Only Memory (EEPROM), a storage device, an optical disc, etc. In some examples, computer-readable storage medium 302 may be a non-transitory storage medium, where the term "non-transitory" does not encompass transitory propagating signals. As described in detail below, computer-readable storage medium 302 may be encoded with a series of processor executable instructions 304-308.

Orientation determination instructions 304 may determine an orientation of electronic device 300 based on first rotational motion sensor 114, second rotational motion sensor 122, bend sensor 124, first display 108, second display 116, or a combination thereof. For example, processor 202 may determine an orientation of first housing 102 based on first rotational motion sensor 114. Processor 202 may also determine an orientation of second housing 104 based on second rotational motion sensor 122. Processor 202 may further determine a bending angle of hinge 106. Based on the orientation of first housing 102, the orientation of second housing 104, and the bending angle, processor 202 may determine an orientation of electronic device 100.

Antenna selection instructions 306 may select two of antennas 110, 112, 118, and 120 for transmission and reception. For example, processor 202 may instruct communication device 126 to select two of antennas 110, 112, 118, and 120 to transmit and receive wireless signal based on the orientation of electronic device 300. Data transmission and reception instructions 308 may transmit and receive data via the selected antennas. For example, communication device 126 may route data to the selected antennas for transmission and may route data received at the selected antennas to processor 202 for processing. In some examples, processor 202 may use a lookup table 310 to determine an orientation of electronic device and/or antenna selections. Lookup table 310 may list orientations of electronic device 300. In lookup table 310, each of the orientations may be associated with a distinct antenna pair selection.

Figure 4:
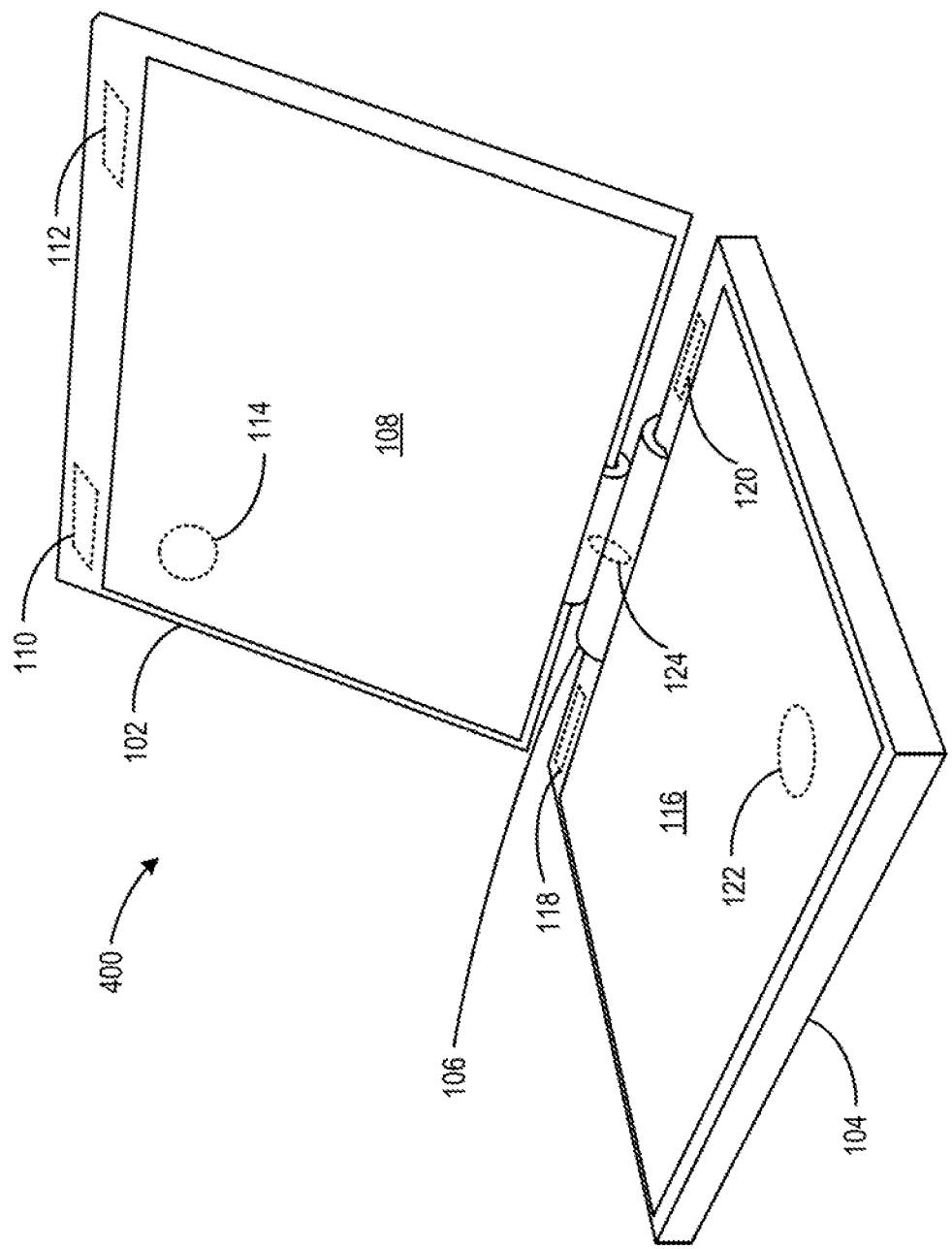
FIG. 4 illustrates an electronic device to select antennas for communication based on sensors, according to an example.

FIG. 4 illustrates an electronic device 400 to select antennas for communication based on sensors, according to an example. Electronic device 400 may be implemented using electronic device 300 of FIG. 3. Electronic device 400 may include components of electronic device 300. Antennas 110 and 112 may be located within housing 102 (as indicated by dash lines) and above first display 108. Antennas 118 and 120 may be located within second housing 104 (as indicated by dash lines) and above second display 116. Antennas 118 and 120 may be closer to hinge 106 than antennas 110 and 112. Bend sensor 124 may be located within hinge 106 (as indicated by dash lines). First rotational motion sensor 114 may be located within first housing 102 (as indicated by dash lines) and behind first display 108. Second rotational motion sensor 122 may be located within second housing 104 (as indicated by dash lines) and behind second display 116. Hinge 106 may enable one of housings 102 and 104 rotate relative to the other of housings 102 and 104 more than 180 degrees to change an orientation of electronic device 400. Thus, rotations of housings 102 and 104 may be used to determine an orientation of electronic device 400, as described in more details in FIG. 5.

Figure 5:
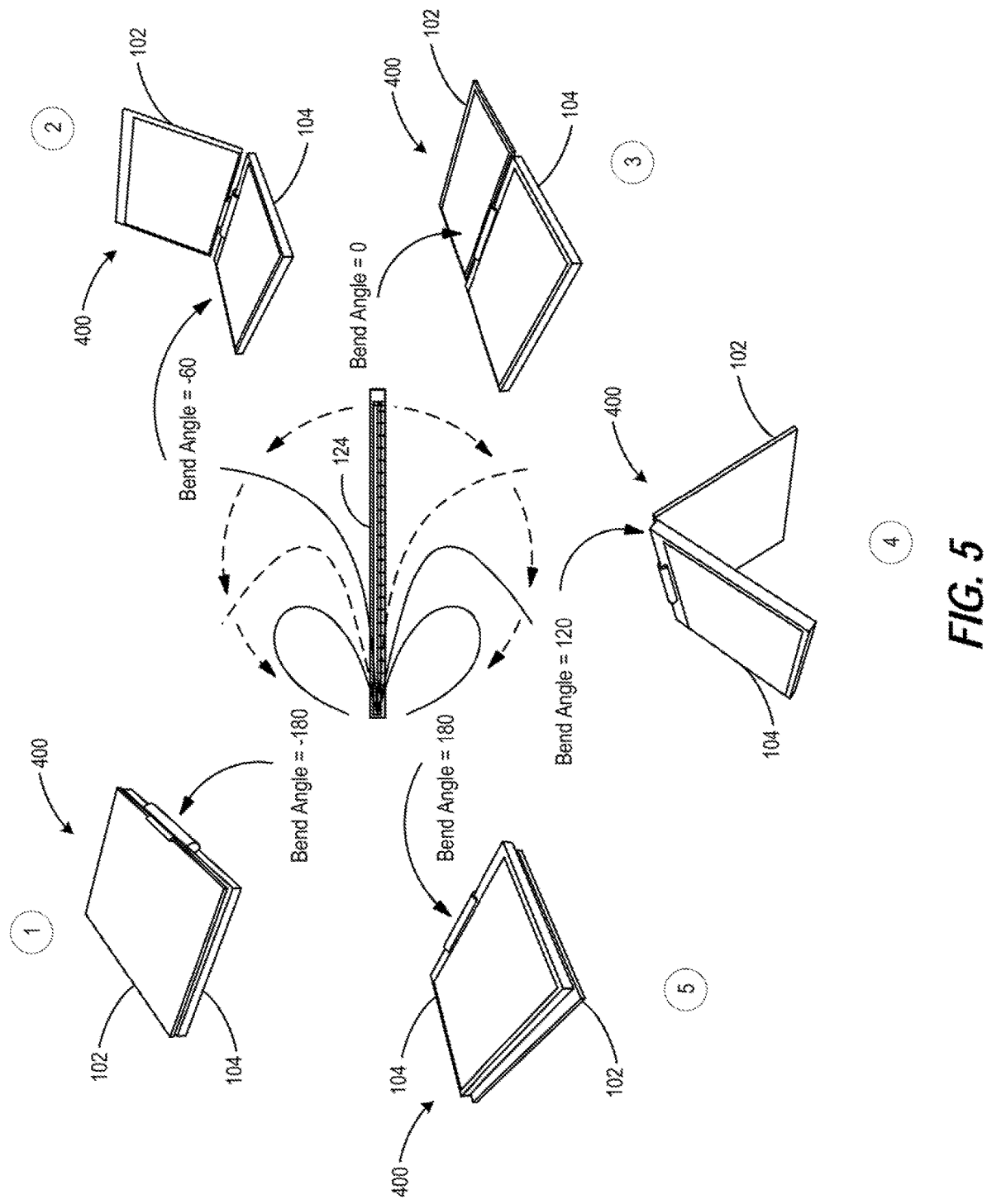
FIG. 5 illustrates determining an orientation of an electronic device based on a bend sensor, according to an example.

FIG. 5 illustrates determining an orientation of an electronic device based on a bend sensor, according to an example. In FIG. 5, five example orientations of electronic device 400 are shown. Each example orientation may be associated with a distinct bending angle as sensed by bend sensor 124. For example, at orientation 1, when the bending angle as sensed by bend sensor is at −180 degrees, electronic device 400 may be at a closed orientation such that first housing 102 and second housing 104 are stacked and first display 108 (not shown) and second display 116 (not shown) may face each other. At orientation 2, when the bending angle as sensed by bend sensor is at −60 degrees, electronic device 400 may be at an open orientation such that first housing 102 has rotated away from second housing 104 by 120 degrees. At orientation 3, when the bending angle as sensed by bend sensor is at 0 degree, electronic device 400 may be at an open orientation such that first housing 102 has rotated away from second housing 104 by 180 degrees.

At orientation 4, when the bending angle as sensed by bend sensor is at 120 degrees, electronic device 400 may be at an open orientation such that first housing 102 has rotated away from second housing 104 by 300 degrees. At orientation 5, when the bending angle as sensed by bend sensor is at 180 degrees, electronic device 400 may be at an open orientation such that first housing 102 has rotated away from second housing 104 by 360 degrees. Thus, bend sensor 124 may provide information on the orientations of housings 102 and 104 relative to each other. However, there are other orientations that have the same bend angle as the orientations illustrated in FIG. 5. For example, instead of having second housing 104 laid flat as illustrated in orientation 2, first housing 102 may be laid flat while maintaining the same rotation away from second housing 104. The bend angle sensed by bend sensor 124 is still −60 degrees. Distinguishing orientations that have the same bend angle is described in more detail in FIGS. 6A-6C.

Figure 6A:
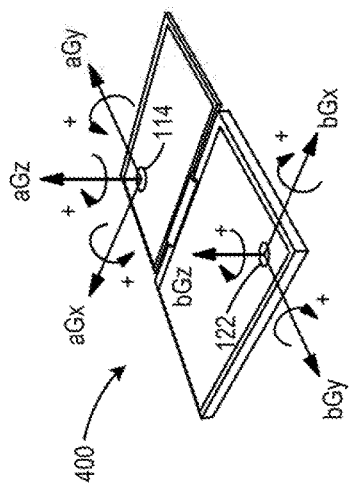
FIG. 6A illustrates rotational motion sensors in housings of an electronic device to determine an orientation of the electronic device, according to an example.

FIG. 6A illustrates rotational motion sensors in housings of an electronic device to determine an orientation of the electronic device, according to an example. Rotational motion sensors 114 and 122 may be implemented using 3-axis gyro sensors. As illustrated in FIG. 6A, first rotational motion sensor 114 may sense angular velocities in axes aGx, aGz, and aGy. Similarly, second rotational motion sensor 122 may sense angular velocities in axes bGx, bGz, and bGy. To determine an orientation of electronic device 400 based on rotational motion sensors 114 and 122, electronic device 400 may first undergo calibrations, as described in more detail in FIGS. 6B-6C.

Figure 6C:
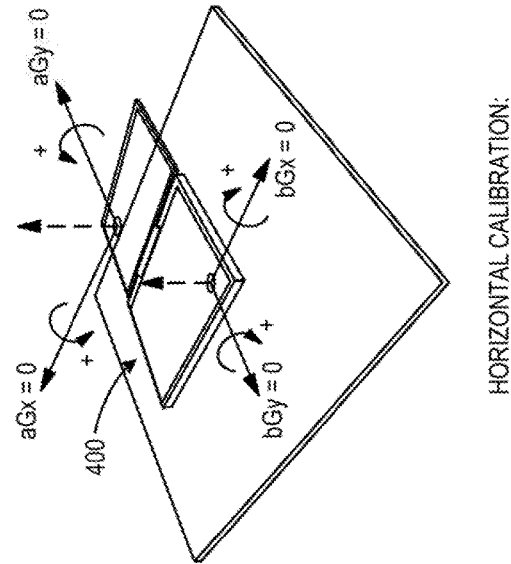
FIG. 6C illustrates a horizontal calibration process of the rotational motion sensors of FIG. 6A, according to an example.
Figure 6B:
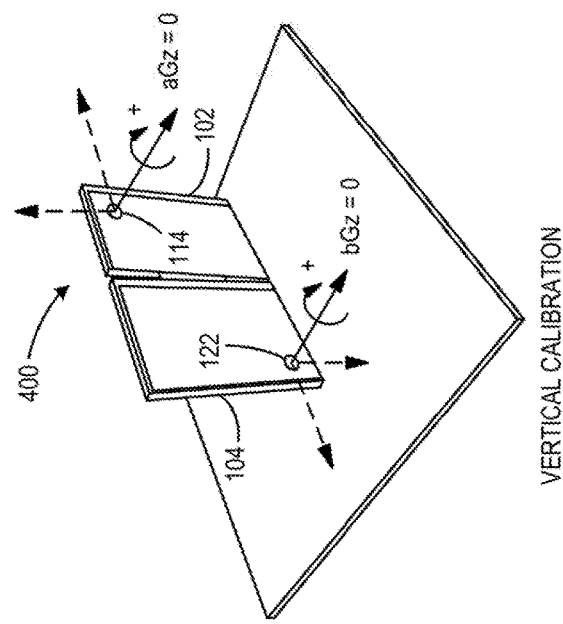
FIG. 6B illustrates a vertical calibration process of the rotational motion sensors of FIG. 6A, according to an example.

FIG. 6B illustrates a vertical calibration process of rotational motion sensors of FIG. 6A, according to an example. Electronic device 400 may undergo a vertical calibration and a horizontal calibration. During a vertical calibration, electronic device 400 may stand on one side as illustrated in FIG. 6A and set axis aGz from first rotational motion sensor 114 and axis bGz from second rotational motion sensor 122 to 0 degree rotation. Horizontal calibration is described in more detail in FIG. 6C.

FIG. 6C illustrates a horizontal calibration process of the rotational motion sensors of FIG. 6A, according to an example. During a horizontal calibration, electronic device 400 may be laid flat on one side as illustrated in FIG. 6B and set axes aGx and aGy from first rotational motion sensor 114 and axes bGx and bGy from second rotational motion sensor 122 to 0 degree rotation.

Figure 7:
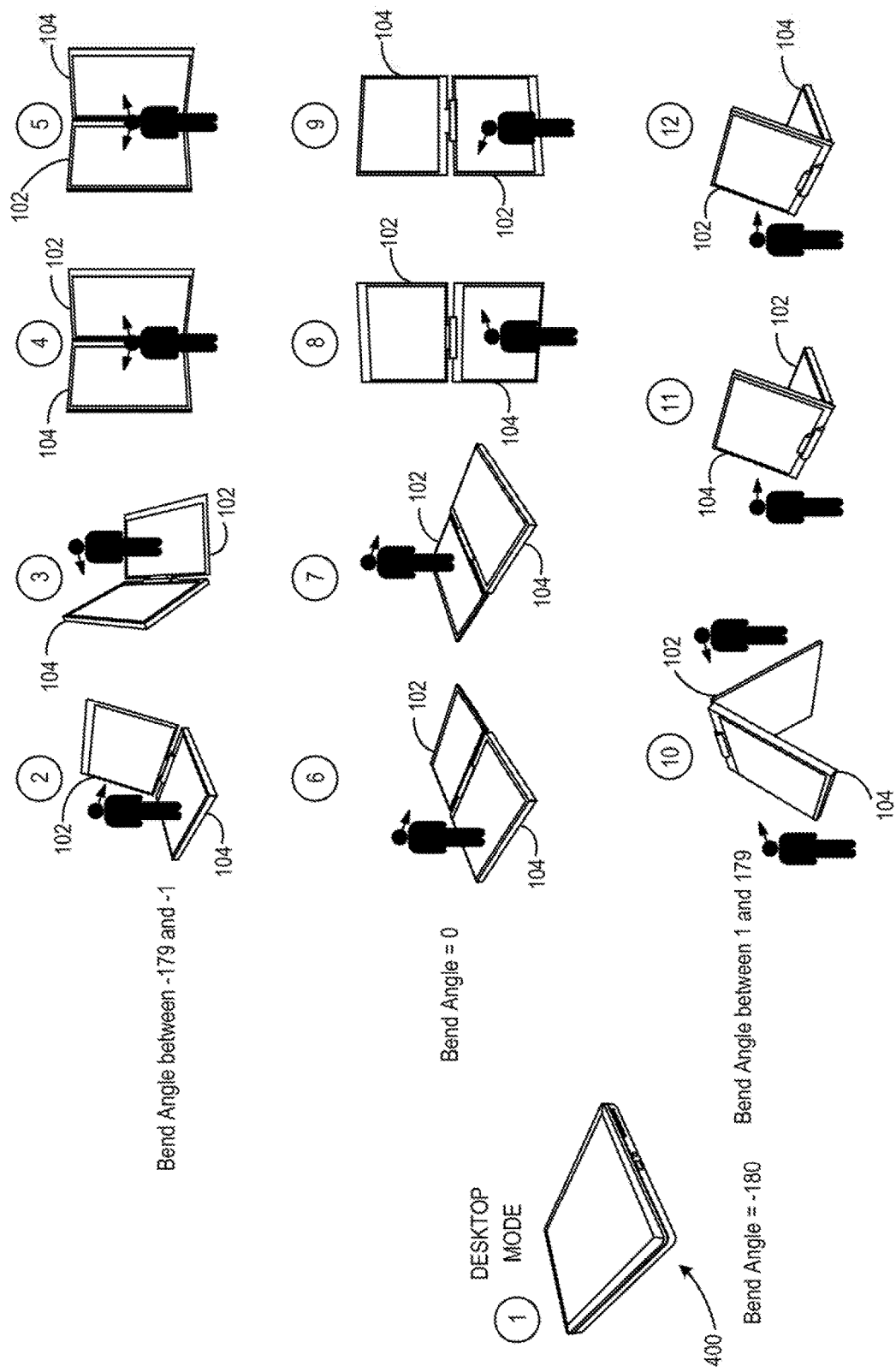
FIG. 7 illustrates orientations of an electronic device determined based on sensors, according to an example.

FIG. 7 illustrates orientations of an electronic device determined based on sensors, according to an example. Electronic device 400 may operate in two different operating modes: a desktop mode and a tablet mode. In the desktop mode, the bend angle is between −180 and 179 degrees. When electronic device 400 is in the desktop mode, electronic device 400 may have twelve orientations (labelled 1-12) as illustrated in FIG. 7. In each orientation, a user of electronic device 400 may interact with displays 108 and 116 differently. Tablet mode is described in more detail in FIG. 8.

Figure 8:
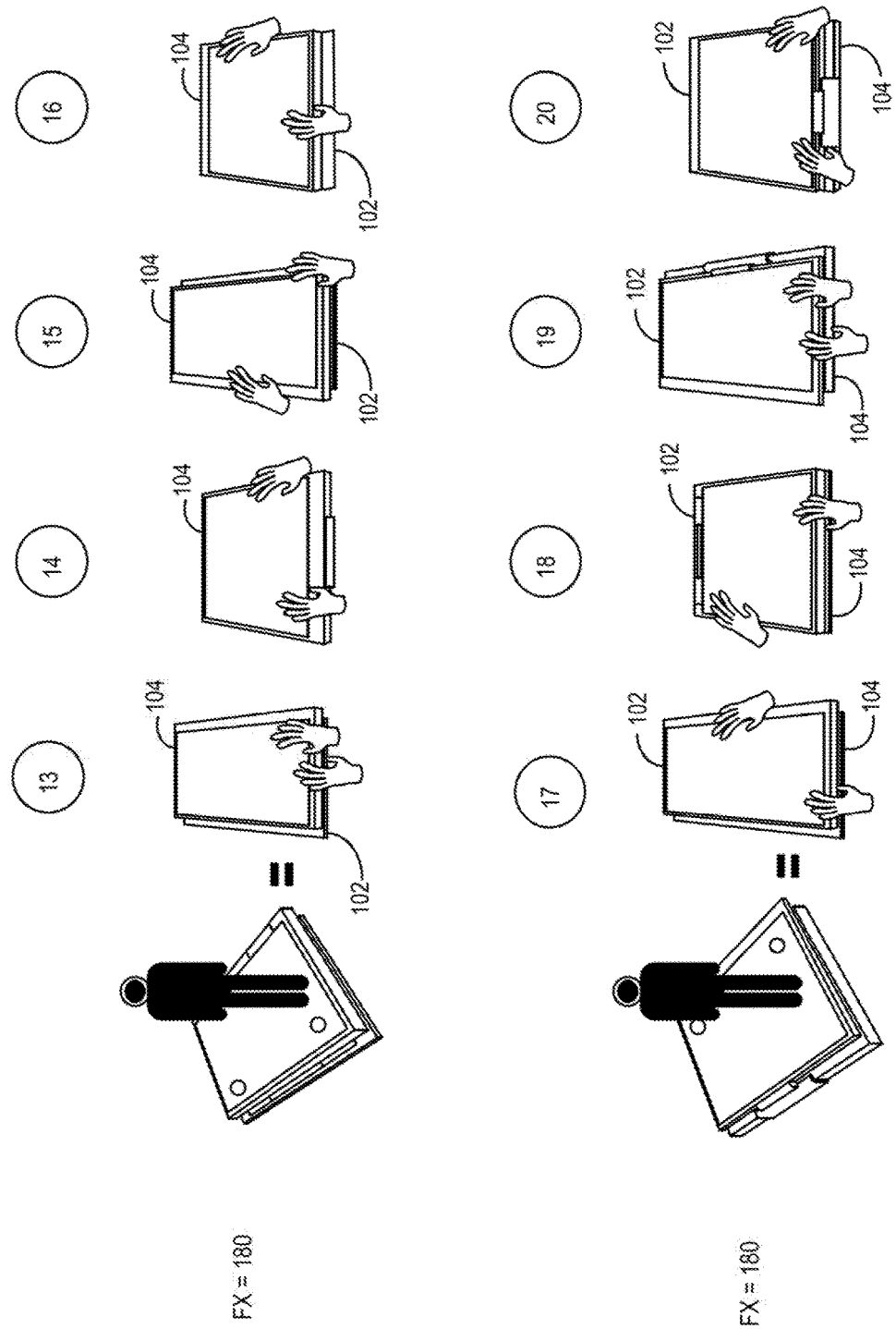
FIG. 8 illustrates orientations of an electronic device determined based on sensors, according to another example.

FIG. 8 illustrates orientations of an electronic device determined based on sensors, according to another example. In the tablet mode, the bend angle is at 180 degrees. When electronic device 400 is in the desktop mode, electronic device 400 may have eight orientations (labelled 13-20) as illustrated in FIG. 8. Thus, electronic device 400 may have twenty orientations combined in both desktop mode and tablet mode. As described in more detail in FIG. 9, each orientation may be associated with a distinct antenna pair selection.

FIG. 9 illustrates a lookup table 900 to determine antenna selections based on an orientation of an electronic device, according to an example. Lookup table 900 may describe antenna selections for each orientation of electronic device 400. Lookup table 900 may include a plurality of columns of information. For example, lookup table 900 may include a column 902 to indicate orientations of electronic device 400, a column 904 to indicate operating modes of a corresponding orientation, a column 906 to indicate a bend angle of a corresponding orientation, columns 908-912 to indicate outputs from first rotational motion sensor 114, columns 914-918 to indicate outputs from second rotational motion sensor 122, columns 920-926 to indicate which two of antennas 110, 112, 118, and 120 are selected for a corresponding orientation.

For purpose of brevity, antenna selections for orientations 1-2 and 19-20 are described. When electronic device 400 is in orientation 1, electronic device 400 may be in desktop mode. The bend angle may be at −180 degrees. The value of axis aGx of first rotational motion sensor 114 may be at 180 degrees. The values of axes aGy and aGz of first rotational motion sensor 114 may be ignored. The value of axis bGx of second rotational motion sensor 122 may be at 0 degree. The values of axes bGy and bGz of second rotational motion sensor 122 may be ignored. Antennas 110 and 112 may be selected for communication for orientation 1 (as indicated by the letter "S" under columns 920 and 922). Antennas 118 and 120 are not selected (as indicated by the blank space under columns 924 and 926).

When electronic device 400 is in orientation 2, electronic device 400 may be in desktop mode. The bend angle may be between −179 to −1 degrees. The value of axis aGx of first rotational motion sensor 114 may be at any value (as indicated by the delta symbol "Δ"). The values of axes aGy and aGz of first rotational motion sensor 114 may be ignored (as indicated by the blank entries). The value of axis bGx of second rotational motion sensor 122 may be at 0 degree. The values of axes bGy and bGz of second rotational motion sensor 122 may be ignored. Antennas 110 and 112 may be selected for communication in orientation 2.

When electronic device 400 is in orientation 19, electronic device 400 may be in tablet mode. The bend angle may be at 180 degrees. The value of axis aGx of first rotational motion sensor 114 may be at 0 degree. The value of axis aGy of first rotational motion sensor 114 may be ignored. The value of axis aGz of first rotational motion sensor 114 may be at −180 degrees. The value of axis bGx of second rotational motion sensor 122 may be at 180 degrees. The value of axis bGy of second rotational motion sensor 122 may be ignored. The value of axis bGz of second rotational motion sensor may be at 180 degrees. Antennas 110 and 120 may be selected for communication in orientation 19.

When electronic device 400 is in orientation 20, electronic device 400 may be in tablet mode. The bend angle may be at 180 degrees. The value of axis aGx of first rotational motion sensor 114 may be at 0 degree. The value of axis aGy of first rotational motion sensor 114 may be ignored. The value of axis aGz of first rotational motion sensor 114 may be at −270 degrees. The value of axis bGx of second rotational motion sensor 122 may be at 180 degrees. The value of axis bGy of second rotational motion sensor 122 may be ignored. The value of axis bGz of second rotational motion sensor may be at 270 degrees. Antennas 110 and 112 may be selected for communication in orientation 20.

The use of "comprising", "including" or "having" are synonymous and variations thereof herein are meant to be inclusive or open-ended and do not exclude additional unrecited elements or method steps.

What is claimed is:

1. An electronic device comprising:
a first housing including, a first display, a first antenna, a second antenna, and a first rotational motion sensor;
a hinge including a bend sensor;
a second housing rotatably coupled to the first housing via the hinge, the second housing including a second display, a third antenna, a fourth antenna, and a second rotational motion sensor;

wherein the first display and the second display are touch-sensitive displays, and wherein the first display is separate from the second display; and a communication device to:
    select two of the first antenna, the second antenna, the third antenna, and the fourth antenna based on the first rotational motion sensor, the second rotational motion sensor, the bend sensor, and a touch input detected on the first display or the second display; and
    transmit and receive data via each of the two selected antennas.

2. The electronic device of claim 1, wherein the first antenna and the second antenna are distal to the hinge, and wherein the third antenna and the fourth antenna are proximal to the hinge.

3. The electronic device of claim 1, wherein the first rotational motion sensor and the second rotational motion sensor are 3-axis gyro sensors.

4. The electronic device of claim 3, wherein the communication device is to select two of the first antenna, the second antenna, the third antenna, and the fourth antenna based on the first rotational motion sensor, the second rotational motion sensor, the bend sensor, a touch input detected on the first display, and a touch input detected on the second display.

5. The electronic device of claim 1, wherein the communication device is to select two of the first antenna, the second antenna, the third antenna, and the fourth antenna based on a location of a the touch input detected on the first display or the second display.

6. An electronic device comprising:
    a first housing including a first display, a first antenna, and a second antenna;
    a hinge;
    a second housing rotatably coupled to the first housing via the hinge, the second housing including a second display, a third antenna, and a fourth antenna;
    a processor to:
        determine an orientation of the first housing via a first rotational motion sensor in the first housing;
        determine an orientation of the second housing via a second rotational motion sensor in the second housing; and
        determine an operating mode of the electronic device via a bend sensor in the hinge; and
    a communication device to:
        select two of the first antenna, the second antenna, the third antenna, and the fourth antenna based on the orientation of the first housing, the orientation of the second housing, and the operating mode; and
        transmit and receive data via each of the two selected antennas.

7. The electronic device of claim 6, wherein the operating mode includes a desktop mode and a tablet mode.

8. The electronic device of claim 6, wherein the first display and the second display are touch-sensitive displays.

9. The electronic device of claim 8, wherein the communication device is to select two of the first antenna, the second antenna, the third antenna, and the fourth antenna based on the first rotational motion sensor, the second rotational motion sensor, the bend sensor, and a touch input detected on the first display or the second display.

10. The electronic device of claim 9, wherein the communication device is to select two of the first antenna, the second antenna, the third antenna, and the fourth antenna based on a location of a the touch input detected on the first display or the second display.

11. A non-transitory computer readable storage medium comprising instructions that when executed cause a processor of an electronic device to:
    determine an orientation of the electronic device based on a first rotational motion sensor in a first housing of the electronic device, a second rotational motion sensor in a second housing of the electronic device, and a bend sensor in a hinge of the electronic device, wherein the first housing is rotatably coupled to the second housing via the hinge, wherein the first housing includes a first display, and wherein the second housing includes a second display;
    select, via a communication device of the electronic device, two of a first antenna, a second antenna, a third antenna, and a fourth antenna based on the orientation and a touch input detected on the first display or the second display, wherein the first antenna and the second antenna are located in the first housing, and wherein the third antenna and the fourth antenna are located in the second housing; and
    transmit and receive data via each of the two selected antennas in a multiple-input/multiple-output (MIMO) network.

12. The non-transitory computer readable storage medium of claim 11, wherein the orientation is determined via a lookup table.

13. The non-transitory computer readable storage medium of claim 12, wherein the lookup table includes twenty orientations of the electronic device.

14. The non-transitory computer readable storage medium of claim 13, wherein each of the twenty orientations is associated with a distinct antenna pair selection.

15. The non-transitory computer readable storage medium of claim 11, wherein the first rotational motion sensor and the second rotational motion sensor are 3-axis gyro sensors.

16. The non-transitory computer readable storage medium of claim 11, wherein the instructions, when executed by the processor, cause the processor to select, via the communication device, two of the first antenna, the second antenna, the third antenna, and the fourth antenna based on a location of a the touch input detected on the first display or the second display.

* * * * *